US009767492B2

(12) United States Patent
Leng (10) Patent No.: US 9,767,492 B2
(45) Date of Patent: Sep. 19, 2017

(54) RANKING AND SEARCHING METHOD AND APPARATUS BASED ON INTERPERSONAL DISTANCES (75) Inventor: Shanshu Leng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 930 days.

(21) Appl. No.: 13/637,116

(22) PCT Filed: Jul. 12, 2012

(86) PCT No.: PCT/US2012/046464
§ 371 (c)(1),
(2), (4) Date: Sep. 25, 2012

(87) PCT Pub. No.: WO2013/009980
PCT Pub. Date: Jan. 17, 2013

(65) Prior Publication Data
US 2013/0024447 A1 Jan. 24, 2013

(30) Foreign Application Priority Data

Jul. 13, 2011 (CN) .......................... 2011 1 0195506

(51) Int. Cl.
G06F 17/30 (2006.01)
G06Q 30/02 (2012.01)
G06Q 50/00 (2012.01)
(52) U.S. Cl.
CPC ......... G06Q 30/0282 (2013.01); G06Q 50/01 (2013.01)
(58) Field of Classification Search
USPC ....................................................... 707/724
See application file for complete search history.

(56) References Cited

U.S. PATENT DOCUMENTS 7,233,940 B2 * 6/2007 Bamberger et al.
2004/0003132 A1 * 1/2004 Stanley et al. ................ 709/316
(Continued)

FOREIGN PATENT DOCUMENTS

CN 101499101 A 5/2009
JP 2008097365 4/2008
(Continued)

OTHER PUBLICATIONS

PCT Search Report and Written Opinion mailed Aug. 21, 2012 for PCT application No. PCT/US12/46464, 15 pages.
(Continued)

*Primary Examiner* — Belix M Ortix Ditren
(74) *Attorney, Agent, or Firm* — Lee & Hayes, PLLC (57) ABSTRACT The present disclosure discloses a method and an apparatus for ranking and searching based on interpersonal distances. The method includes: obtaining, by a ranking server, objects queried by a query request based on the request initiated from a user client and obtaining reference user groups corresponding to the queried objects; obtaining, by a ranking server, an interpersonal distance between each user in the reference user groups and a user who initiates the query request, and obtaining rating scores of the objects queried by the request that are given by each user in respective reference user groups; determining, by a ranking server, user relationship ranking indices of the objects based on the interpersonal distances and the rating scores, and ordering the objects based on the user relationship ranking indices of the objects. Compared with the existing technologies, the example ranking server performs ranking based on interpersonal distances between a user and reference users as well as rating scores associated with the reference users, quantifies a reference value of choices associated with a social network of the user with respect to shopping choices of the user, and
(Continued)

provides a ranking method that is based on characteristics of the user.

13 Claims, 7 Drawing Sheets

(56) References Cited

U.S. PATENT DOCUMENTS

| | | | |
|---|---|---|---|
| 2005/0004889 A1* | 1/2005 | Bailey et al. | 707/1 |
| 2007/0060173 A1* | 3/2007 | Ramer et al. | 455/456.3 |
| 2008/0183694 A1 | 7/2008 | Cane et al. | |
| 2008/0195586 A1 | 8/2008 | Arnold et al. | |
| 2009/0006388 A1 | 1/2009 | Ives et al. | |
| 2009/0030801 A1 | 1/2009 | Meggs | |
| 2009/0063304 A1* | 3/2009 | Meggs | 705/27 |
| 2010/0174712 A1 | 7/2010 | Li et al. | |
| 2010/0223261 A1* | 9/2010 | Sarkar | 707/726 |
| 2011/0093460 A1 | 4/2011 | Lunt et al. | |
| 2011/0106597 A1 | 5/2011 | Ferdman et al. | |
| 2011/0106895 A1 | 5/2011 | Ventilla et al. | |
| 2011/0264648 A1 | 10/2011 | Gulik et al. | |
| 2011/0264660 A1 | 10/2011 | Tankovich et al. | |
| 2012/0117581 A1 | 5/2012 | Curtis et al. | |
| 2012/0131013 A1 | 5/2012 | Hobbs et al. | |
| 2012/0131034 A1* | 5/2012 | Kenedy et al. | 707/767 |
| 2012/0278317 A1* | 11/2012 | Spiegel | 707/731 |

FOREIGN PATENT DOCUMENTS

| | | |
|---|---|---|
| JP | 2009529199 | 8/2009 |
| JP | 2009289092 | 12/2009 |
| WO | WO2011025696 A1 | 3/2011 |
| WO | WO2011068974 | 6/2011 |

OTHER PUBLICATIONS

Chinese Office Action mailed Sep. 12, 2014, for Chinese patent application No. 201110195506.9, a counterpart foreign application of U.S. Appl. No. 13/637,116, 12 Pages.

Chinese Office Action mailed Mar. 11, 2015, for Chinese patent application No. 201110195506.9, a counterpart foreign application of U.S. Appl. No. 13/637,116, 20 Pages.

Japanese Office Action dated Mar. 7, 2017 for Japanese Patent Application No. 2014-520322, a counterpart foreign application of U.S. Appl. No. 13/637,116, 7 pages.

Japanese Notice of Allowance dated for Japanese Patent Application No. 2014-520322, a counterpart foreign application of U.S. Appl. No. 13/637,116, 6 pages.

* cited by examiner

RANKING AND SEARCHING METHOD AND APPARATUS BASED ON INTERPERSONAL DISTANCES

CROSS REFERENCE TO RELATED PATENT APPLICATIONS

This application is a national stage application of an international patent application PCT/US12/46464, filed Jul. 12, 2012, which claims priority from Chinese Patent Application No. 201110195506.9 filed on Jul. 13, 2011, entitled "Ranking and Searching Method and Apparatus Based on Interpersonal Distances," which applications are hereby incorporated by reference in their entirety.

TECHNICAL FIELD

The present disclosure relates to the field of computer science and Internet technologies, and more particularly, relates to ranking and searching methods and apparatuses based on interpersonal distances.

BACKGROUND

When shopping online, users usually use product rankings as a reference to determine which products to buy. Product rankings which are currently available to the users include rankings based on prices, geographical locations, credibility ratings, volume of sales, etc. These rankings, however, may not allow the users to find products they want to buy because whether a product is suitable for a user is not merely a matter of prices or credit ratings. Although credit ratings reflect qualities of products to some extent, a product having a high credit rating cannot be guaranteed to be the product that is desired by a user. Besides factors such as prices and credit ratings, user interests and hobbies are also factors that determine whether a certain product is favorably selected by a user. Existing product ranking methods only take factors like prices and credit ratings into account, without considering factors such as user interests and hobbies, thus failing to provide a ranking method that incorporates user characteristics. As such, users cannot quickly obtain their expected search results and need to perform searching for multiple times with relatively long searching times. Furthermore, the burden on network communication and the processing load of servers are increased, reducing the processing performance of the servers.

Furthermore, degrees of familiarity between users and merchants may also affect decision of the users in selecting products. If a user or his/her friend has previously conducted a successful transaction with a merchant, this merchant will have a higher likelihood of being selected by the user as compared to merchants who have not developed any relationship with the user. Existing online shopping platforms only rate creditability of a merchant based on transaction records. However, if a user has very different shopping habits or interests and hobbies than users who have previously conducted successful transactions with the merchant, the user may still not favorably select this merchant who has a good credit rating. Therefore, the existing methods that are based on past transaction records of merchants fail to incorporate user characteristics in ratings and ranking. Existing rating and ranking methods fail to incorporate user characteristics for processing, thus leading users fail to quickly obtain expected search results. The users need to perform searching for multiple times with relatively long searching times. Furthermore, the burden of network communication and the processing load of servers are increased, thus reducing the processing performance of the servers.

SUMMARY

Embodiments of the present disclosure provide methods and apparatuses for ranking and searching based on interpersonal distances in order to solve the failure of existing ranking methods in incorporating user characteristics for ranking.

According to a first aspect of the present disclosure, a ranking server may obtain objects queried by a query request based on the request initiated from a user client and obtain reference user groups corresponding to the queried objects. The ranking server may obtain an interpersonal distance between each user in the reference user groups and a user who initiates the query request, and obtain rating scores of the objects queried by the request that are given by each user in respective reference user groups. Additionally, the ranking server may determine user relationship ranking indices of the objects based on the interpersonal distances and the rating scores. The ranking server may order the objects based on the user relationship ranking indices of the objects.

According to a second aspect of the present disclosure, a ranking server may obtain reference merchants in which objects queried by a query request are located based on the query request submitted from a user client. The ranking server may obtain interpersonal distances between a user who submits the query request and the reference merchants, and obtain rating scores of the reference merchants. In some embodiments, the ranking server may determine merchant relationship ranking indices of the reference merchants based on the interpersonal distances and the rating scores, and order the reference merchants based on the merchant relationship ranking indices.

According to a third aspect of the present disclosure, a ranking server may receive a query request initiated from a user client, obtain objects queried by the request and determine composite indices of the objects. The ranking server may order the objects based on the composite indices of the objects. In some embodiments, the ranking server may determine the composite indices of the objects based on one of the following strategies. According to the first strategy, the ranking server may determine user relationship ranking indices of the objects requested to be queried by a user according to the above interpersonal distance based ranking method, and determine the composite indices of the objects based on the user relationship ranking indices and an online shopping platform index. Alternatively, according to the second strategy, the ranking server may determine merchant relationship ranking indices of merchants in which the objects are located according to the above interpersonal distance based ranking method, and determine the composite indices of the objects based on the merchant relationship ranking indices and the online shopping platform index. Alternatively, according to the third strategy, the ranking server may determine the user relationship ranking indices of the objects requested to be queried by the user according to the above interpersonal distance based ranking method, and determine the merchant relationship ranking indices for the merchants in which the objects are located according to the above interpersonal distance based ranking method. The ranking server may determine the composite indices of the objects based on the user relationship ranking indices and the merchant relationship ranking indices or determine the composite indices of the objects based on the user relationship ranking indices, the merchant relationship ranking indices and the online shopping platform index.

According to a fourth aspect of the present disclosure, a ranking server may receive a query request from a user client. The ranking server may determine user relationship ranking indices of objects requested to be queried by a user according to the above interpersonal distance based ranking method, and order the objects based on the user relationship ranking indices of the objects. In one embodiment, the ranking server may determine merchant relationship ranking indices of merchants in which the objects are located according to the above interpersonal distance based ranking method, and ordering the objects based on the merchant relationship ranking indices of the merchants in which the objects are located. Alternatively, the ranking server may determine composite indices of the objects according to the above interpersonal distance based ranking method, and ordering the objects based on the composite indices of the objects. In some embodiments, the ranking server may return a query result to the user who initiates the request based on a result of the ordering.

According to a fifth aspect of the present disclosure, a ranking server is provided. The ranking server may include an acquisition unit configured to obtain objects queried by a query request and obtain reference user groups corresponding to the queried object based on the request initiated from a user client. In some embodiments, the acquisition unit may further be configured to obtain an interpersonal distance between each user of the reference user groups and a user who initiates the query request, and obtain rating scores of the objects queried by the request that are given by each user in respective reference user groups. In one embodiment, the ranking server may further include an ordering unit, configured to determine user relationship ranking indices of the queried objects based on the interpersonal distances and the rating scores, and order the objects based on the user relationship ranking indices of the objects.

According to a sixth aspect of the present disclosure, a ranking server is provided. The ranking server may include a determination unit configured to determine reference merchants in which objects queried by a request are located based on the query request submitted from a user client. Additionally, the ranking server may further include an acquisition unit configured to obtain interpersonal distances between a user who submits the query request and the reference merchants, and obtain rating scores of the reference merchants. In some embodiments, the ranking server may further include an ordering unit configured to determine merchant relationship ranking indices for the reference merchants based on the interpersonal distances and the rating scores, and order the reference merchants based on the merchant relationship ranking indices.

According to a seventh aspect of the present disclosure, a ranking server is provided. The ranking server may include an integration unit, configured to receive a query request from a user client, obtain objects queried by the request and determine composite indices of the objects. In some embodiments, the ranking server further includes an ordering unit configured to order the objects based on the composite indices of the object. In one embodiment, the integration unit determines the composite indices based on one of the following strategies:

a first strategy: determining, by the ranking server, user relationship ranking indices of the objects requested to be queried by a user according to the above interpersonal distance based ranking method, and determining the composite indices of the objects based on the user relationship ranking indices and an online shopping platform index;

a second strategy: determining, by the ranking server, merchant relationship ranking indices of merchants in which the objects are located according to the above interpersonal distance based ranking method, and determining the composite indices of the objects based on the merchant relationship ranking indices and the online shopping platform index; or a third strategy: determining, by the ranking server, the user relationship ranking indices of the objects requested to be queried by the user according to the above interpersonal distance based ranking method, and determining the merchant relationship ranking indices for the merchants in which the objects are located according to the above interpersonal distance based ranking method; determining, by the ranking server, the composite indices of the objects based on the user relationship ranking indices and the merchant relationship ranking indices; or, determining, by the ranking server, the composite indices of the objects based on the user relationship ranking indices, the merchant relationship ranking indices and the online shopping platform index.

In the embodiments of the present disclosure, the ranking server obtains objects queried by a request and reference user groups corresponding to the queried objects based on the query request initiated from a user client, obtains an interpersonal distance between each user of the reference user groups and a user who initiates the query request, obtains rating scores of the objects queried by the request that are given by each user in respective reference user groups, determines user relationship ranking indices of the queried objects based on the interpersonal distances and the rating scores, and orders the objects based on the user relationship ranking indices of the objects. Compared with the existing technologies, the example ranking server performs ranking based on interpersonal distances between a user and reference users as well as rating scores associated with the reference users, quantifies a reference value of choices associated with a social network of the user with respect to shopping choices of the user, and provides a ranking method that is based on characteristics of the user.

DETAILED DESCRIPTION

To overcome the problems that exist in the existing technologies, the embodiments of the present disclosure provide methods and apparatuses for ranking and searching based on interpersonal distances.

The embodiments of the present disclosure are described in detail herein with the reference to the accompanying figures.

The example interpersonal distance based ranking method quantifies the influence of characteristics of a user on his/her shopping choice using interpersonal distances associated with the user. A user circle in which a user is involved affects his/her shopping choice. For example, a user is more likely to have similar interests and hobbies with his/her friends than with a stranger. These interests and hobbies may affect the shopping choice of the user. Thus, interpersonal relationship associated with the user may be used to quantify the influence of user characteristics on his/her shopping choice.

First Embodiment

Figure 1:
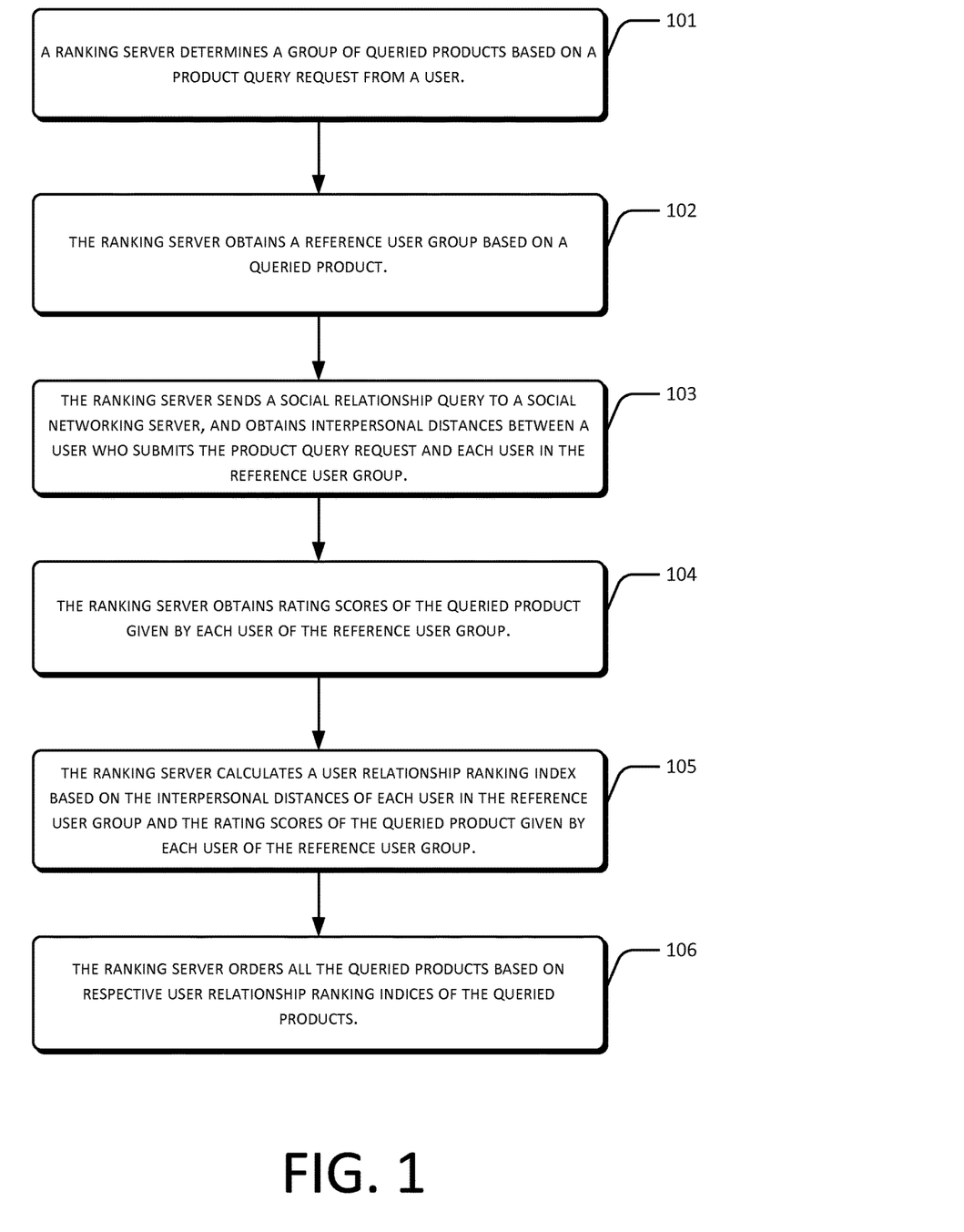
FIG. 1 is a flowchart of a ranking method based on interpersonal distances in accordance with the embodiments of the present disclosure.

As illustrated in FIG. 1, the first embodiment of the present disclosure provides a ranking method based on interpersonal distances, which may include:

At block 101, a ranking server determines a group of queried products based on a product query request from a user.

Prior to block 101, the ranking server may further receive, from a client used by the user, the product query request, which includes product description information such as category information of a product, information of merchants providing the product, identification information of the product (e.g. a name or model number of the product, etc.), other related information, or a combination thereof. The ranking server may render all matching products as a group of queried products based on the product description information. Based on existing search technologies, information of a certain keyword may be ignored or similar results may be used as search results when no search results are returned due to too many keywords in the product query request.

At block 102, the ranking server obtains a reference user group based on a queried product.

The ranking server may set up a correspondence relationship between a queried product and a reference user group in advance, obtain the reference user group based on the correspondence relationship, and assign each queried product with a respective group of reference users in advance.

Alternatively, the ranking server may select a group of reference users based on a queried product. Before selecting the group of reference users, the ranking server may further define a sample size of the group of reference users needed to be selected. The sample size may be predefined by a system based on empirical values.

A reference user group may be a group of users who have purchased a certain queried product. For example, if a sample size for a reference user group is defined to be one hundred, one hundred users who have recently purchased the queried product may be selected as a group of reference users. A user of a reference user group may be set to possess uniqueness. For example, if buyers associated with ten recent transaction records of the product correspond to a same user, only one user is counted as selected, and ninety-nine additional different users are to be selected.

The reference user group may also be a group of users who have expressed purchase intentions for the queried product. Willing users who have provided rating levels of purchase intention may be preferably selected. Under such a situation, shopping platform websites provide corresponding functions to record shopping wishes of users for the product, and provide a function for rating purchase intention level. For example, a user may represent an intention level by selecting from 1-10, with 1-10 representing a progressive increase of purchase intention. If a reference user group is set to be a group of willing users and the sample size of the reference user group is set to be one hundred, one hundred users who have recently expressed their purchase intentions for the product and also provided intention values are selected as corresponding group of reference users.

The reference user group may also be a mixed user group including a group of users who have purchased the queried product and a group of willing users based on a ratio between respective sample sizes of the user groups. For example, when selecting a group of reference users, a ratio of sample sizes of user groups is 6:4. Thus, number of users for a group of users who have made a purchase constitutes 60% of the total number of users, and number of users of a group of willing users constitutes 40% of the total number of users.

At block 103, the ranking server sends a social relationship query to a social networking server, and obtains interpersonal distances between a user who submits the product query request and each user in the reference user group.

An interpersonal distance is used to describe an interpersonal distance between users. According to the theory of six degrees of separation, number of people between a person and any stranger would not be greater than six. In other words, a person may get to know a stranger through at most six people. A social networking server stores relationships between each user and his/her friends in a friendship system. When a relation of friendship is used to determine an interpersonal distance, such interpersonal distance refers to how many intermediate people are needed to establish a relation of friendship for completely different users in a certain friendship system. Based on friendship relations provided by the social networking server, the ranking server may calculate interpersonal distances between the user and each user in the reference user group. For example, in a certain friendship system, if a user A has a friend B, an interpersonal distance between the user A and the user B is one. If the user B has a friend C, and the user C is not a friend of the user A, an interpersonal distance between the user A and the user C is two, and so forth. According to the theory of six degrees of separation, the maximum distance between two users is seven, where number of friends between the two users is six.

The above friendship system may be a platform storing characteristics of users and friendship relations associated with the users. The social networking server may include a server storing the following one or more friendship systems having information of users and respective friends, e.g., relationships between users and respective friends in a mailbox service system; relationships between users and respective friends in a social networking website; relationships between users and respective friends in an instant messaging system; relationships between users and respective friends in an online game platform; relationships between users and respective friends in a platform for sharing, disseminating and obtaining information based on user relationship; or relationships between users and respective friends in an electronic commerce website. For instance, a user may add his/her friends in a shopping website platform, and friendship relations of all users form a social network. Alternatively, mailbox users have their own address books or buddy lists in a mailbox service system. All the users and their address books form a relationship network. For example, an address book of A has (b, c, d), and an address book of B has (d, g, t, w). As such, an interpersonal distance between A and b is one, and an interpersonal distance between A and w is two. b who has a distance of one has a closer relationship with A than w who has a distance of two. The above friendship system may be a platform storing characteristics of users and friendship relations associated with the users, such as a virtual community network platform, an instant messaging system or an online game platform, etc.

In the embodiments of the present disclosure, the smaller the interpersonal distance is, the closer the interpersonal separation between two users is. A value range for an interpersonal distance may be set to be between 1 and 7. Further, taking into account that not all natural persons are users of a certain friendship system, two users may need more than six people, rather than at most six, to get to know each other. The server calculates interpersonal distances based on friendship. If an interpersonal distance cannot be determined based on friendship relations after a certain period of time or a certain amount of computation of searching, the interpersonal distance may be assigned with a specific value, such as ten.

Furthermore, other than determining the interpersonal distances based on the friendship relations, other information measuring a degree of similarity between two users that can be provided by the social networking server may also be used to cooperatively evaluate the interpersonal distances. In an existing social networking service system, users can be aggregated together for a same topic, study experience, or outing place during weekend, etc. These are parts of social relations, and provide ways other than friendship relations to measure an interpersonal distance between two users.

Specifically, several user properties can be set for evaluating whether two users have any commonality with respect to these user properties. The more properties that two users have in common, the shorter the interpersonal distance therebetween is. Specifically, a weight factor may be assigned to the interpersonal distance to decrease its value based on whether respective properties of the users are the same.

For example, five user properties may be set, which are: (k1, attending a same party), (k2, favoring a same music band), (k3, a same university), (k4, favoring soccer) and (k5, degree of similarity of topics concerned). Based on evaluation of the user properties, an interpersonal distance $K=k1*k2*k3*k4*k5$. If values of a certain user property are the same, the corresponding ki (i$\in$[1, 5]) is assigned a value of 0.8. If values of a user property are not the same, ki is assigned a value of 1. For example, on a basis of friendship relation, if values of k1, k2 and k3 are the same but values of k4 and k5 are different for a user A and a user B, then $K=0.8*0.8*0.8*1*1=0.512$. The above specific parameter values and equations are merely illustrative examples. The present disclosure is not construed to parameters and equations set in the embodiments.

At block 104, the ranking server obtains rating scores of the queried product given by each user of the reference user group.

If a reference user group is a group of users who have purchased the product, rating scores corresponds to ratings given by users in the reference user group. If the reference user group is a group of intended users, rating scores corresponds to rating scores associated with purchase intention levels given by users in the group of intended users.

When the reference user group is a group of users who have purchased the product, certain users thereof may not have provided a rating. A default value may be assigned as the rating scores given by such users. Alternatively, when selecting the reference user group, users who have purchased the product and provided rating scores are selected by default. When the reference user group is a group of users who have expressed purchase intentions, a default value may similarly be assigned as rating scores associated with purchase intention levels for those intended users who have not provided rating scores associated with purchase intention levels. Alternatively, intended users who have expressed their purchase intentions and provided rating scores associated with purchase intention levels are selected by default.

A rating score may be a score given by a user according to a scoring scope provided by the system, or a rating value quantified by the system based on a user-provided evaluation, such as "good, average or bad".

In the present embodiment, block 103 and block 104 can be arranged in any order.

At block 105, the ranking server calculates a user relationship ranking index based on the interpersonal distances of each user in the reference user group and the rating scores of the queried product given by each user of the reference user group.

Specifically, a weight factor is added to a rating score of the queried product that is given by each user of the reference user group. The weight factor is determined based on associated interpersonal distance, reflecting the influence of interpersonal relationship on user rating scores given by the group of reference users. A weight factor decreases as associated interpersonal distance increases. For example, the weight factor may be set to be inversely proportional to the interpersonal distance. Alternatively, in order to increase the influence of interpersonal relationship on the rating scores, the weight factor may be set to be inversely proportional to the square of the interpersonal distance. Alternatively, the weight factor may be set based on other algorithms according to system requirements or empirical results. An average value of rating scores that are weighted by each user of the reference user group is computed to obtain a user relationship ranking index. An algorithm for obtaining user relationship ranking may be computed according to the following equations:

> User relationship ranking index=SUM (rating score/ interpersonal distance)/sample size; or > User relationship ranking index=SUM (rating score*$f$ (interpersonal distance))/sample size, where $f$(interpersonal distance) is a weight factor calculated based on interpersonal distance.

Table 1 shows interpersonal distances between users of a reference user group corresponding to a certain queried product and a user who submits a query request, and respective rating scores of the queried product given by the users. Each user in the reference user group is a user who has purchased the queried product from a merchant.

TABLE 1

| Name of the user | Interpersonal Distance | Rating |
| --- | --- | --- |
| user1 | 1 | 8 |
| user2 | 1 | 8 |
| user3 | 3 | 7 |
| user4 | 2 | 8 |
| user5 | 5 | 6 |
| user6 | 4 | 7 |
| user7 | 3 | 10 |
| user8 | 2 | 9 |
| user9 | 4 | 6 |
| user10 | 6 | 8 |

Based on data in Table 1, a user relationship ranking index for the queried product may be calculated as (8/1+8/1+7/3+

8/2+6/5+7/4+10/3+9/2+6/4+8/6)/10=3.495. Similarly, for other queried products and corresponding reference user groups, user relationship ranking indices for these other queried products may be obtained.

A search based on product category information generally returns multiple queried products. The above blocks 102~105 may be separately performed for each queried product. Therefore, a user relationship ranking index for each queried product may be separately obtained.

At block 106, the ranking server orders all the queried products based on respective user relationship ranking indices of the queried products.

Specifically, an ordering may be performed according to a descending order of user relationship ranking indices. The user relationship ranking indices are average values of rating values that incorporate interpersonal distances. Compared to the conventional evaluation methods that directly perform averaging of rating values, this evaluation method quantifies the influence of a buddy circle associated with a user on a product. For two products having the same average rating value, if one has a higher user relationship ranking index (which indicates that this product receives better comments from the user's friends or a social circle in which the user is involved), this product is more likely to be a search result that is desired by the user who submits the query.

A typical application scenario of the above process is that: a user wants to buy a mobile phone and may submit a query request to the system with a keyword "mobile phone touch screen". The system determines all matching products based on the query request. If the matching results include five hundreds product items, the system renders one hundred previous buyers associated with a product to be a group of reference users based on historical purchase records of the product in respective item. The system calculates a user relationship ranking index for that product based on interpersonal distances between these one hundred buyers and the user who submits the query request as well as ratings of the product given by these one hundred buyers. Upon individually calculating user relationship ranking indices for the five hundred products, the system orders the five hundred products based on respective values of the user relationship ranking indices.

In the present embodiment, the ranking server obtains objects queried by a request based on the query request initiated by a user, obtains reference user groups corresponding to the queried objects, obtains an interpersonal distance between each user of the reference user groups and a user who initiates the query request, obtains rating scores of the objects queried by the request that are given by each user in respective reference user groups, determines user relationship ranking indices of the queried objects based on the interpersonal distances and the rating scores, and orders the objects based on the user relationship ranking indices of the objects. Compared with the existing technologies, the example ranking server performs ranking based on interpersonal distances between a user and reference users as well as rating scores associated with the reference users, quantifies reference value of choices associated with a social network of the user with respect to shopping choice of the user, and provides a ranking method that is based on characteristics of the user.

Second Embodiment

The present embodiment computes merchant relationship ranking indices based on interpersonal distances between reference merchants and a user as well as rating scores of the reference merchant, and ranks the reference merchants based on the merchant relationship ranking indices.

Figure 2:
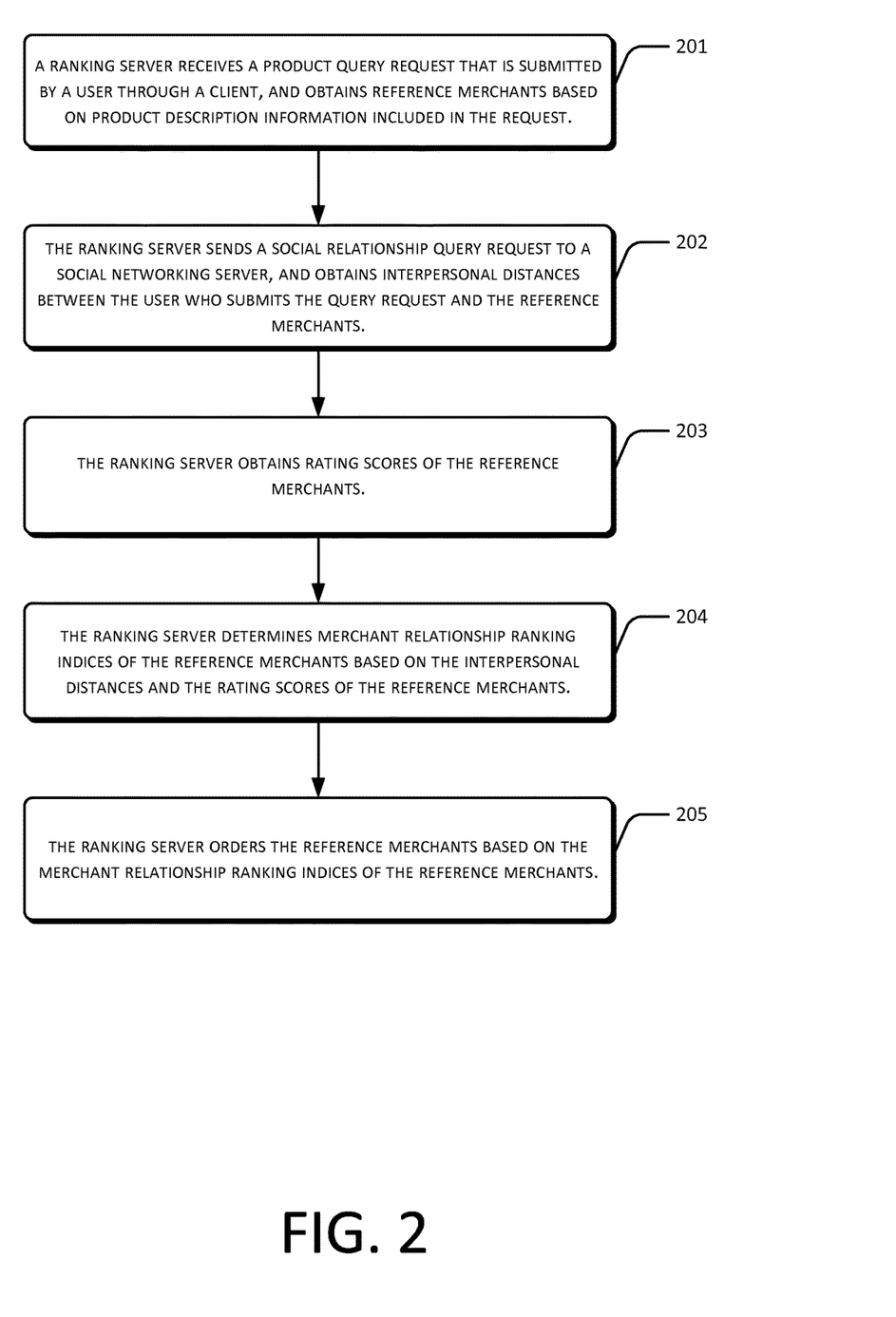
FIG. 2 is a flowchart of a ranking method based on interpersonal distances in accordance with the embodiments of the present disclosure.

FIG. 2 is a flowchart of an example ranking method based on interpersonal distances. As shown in the figure, the method may include:

At block 201, a ranking server receives a product query request that is submitted by a user through a client, and obtains reference merchants based on product description information included in the request.

At block 202, the ranking server sends a social relationship query request to a social networking server, and obtains interpersonal distances between the user who submits the query request and the reference merchants.

An interpersonal distance between a user and a reference merchant may be determined based on friendship relations between the user and the reference merchant in a social network similar to an approach described at block 102.

An interpersonal distance between a user and a reference merchant may also be determined based on transaction records associated with the user and the reference merchant. For example, a value range for interpersonal distances may be between one and seven. If the user and the reference merchant have had a successful transaction, an interpersonal distance between the user and the reference merchant may take on a smaller value, one. If the user and the reference merchant have had a failed transaction, the interpersonal distance between the user and the reference merchant may take on a larger value, seven. An interpersonal distance between a user and a reference merchant may be determined specifically based on a number of transactions and a successful transaction rate between the user and the reference merchant as recorded in a transaction database.

At block 203, the ranking server obtains rating scores of the reference merchants.

The rating scores of the reference merchants may be determined based on an existing method of evaluating merchants in a network transaction platform.

Block 202 and block 203 can be arranged in any order.

At block 204, the ranking server determines merchant relationship ranking indices of the reference merchants based on the interpersonal distances and the rating scores of the reference merchants.

Specifically, for each reference merchant, the longer its interpersonal distance to the user is and the lower a reference value of its rating is, the lower a weight corresponding thereto is.

Computation may be carried out using the following equation:

$$\text{Merchant relationship ranking index} = \text{rating score}/\text{interpersonal distance}.$$

At block 205, the ranking server orders the reference merchants based on the merchant relationship ranking indices of the reference merchants.

Specifically, an ordering may be performed according to a descending order of the merchant relationship ranking indices. For two merchants having the same average rating value, if one merchant has a higher merchant relationship ranking index (which indicates that this merchant receives better comments from the user's friends or the social circle in which the user is involved), that merchant's associated product is more likely to be a search result that is desired by the user who submits the query.

In the present embodiment, the ranking server obtains products queried by a user and reference merchants that provide the queried products based on the queried products. The ranking server sends a social relationship query request to a social networking server, obtains interpersonal distances between the user and the reference merchants, obtains rating scores of the reference merchants, determines merchant relationship ranking indices of the reference merchants based on the interpersonal distances between the user and the reference merchants as well as the rating scores of the reference merchants, and orders the reference merchants based on the merchant relationship ranking indices. Compared to the existing technologies, the example ranking server performs ranking based on interpersonal distances between a user and reference merchants and rating scores of the reference merchants, quantifies a reference value of interpersonal distances between the merchants and the user with respect to a shopping choice of the user, and provides a ranking method that is based on characteristics of the user.

Third Embodiment

The present embodiment computes user relationship ranking indices associated with products based on interpersonal distances between buyers and a user as well as rating scores of the products given by the buyers, computes merchant relationship ranking indices of reference merchants based on interpersonal distances between the merchants providing the product and the user and rating scores of the merchants, and ranks and orders the products based on a corporative consideration of the user relationship ranking indices and the merchant relationship ranking indices.

Figure 3:
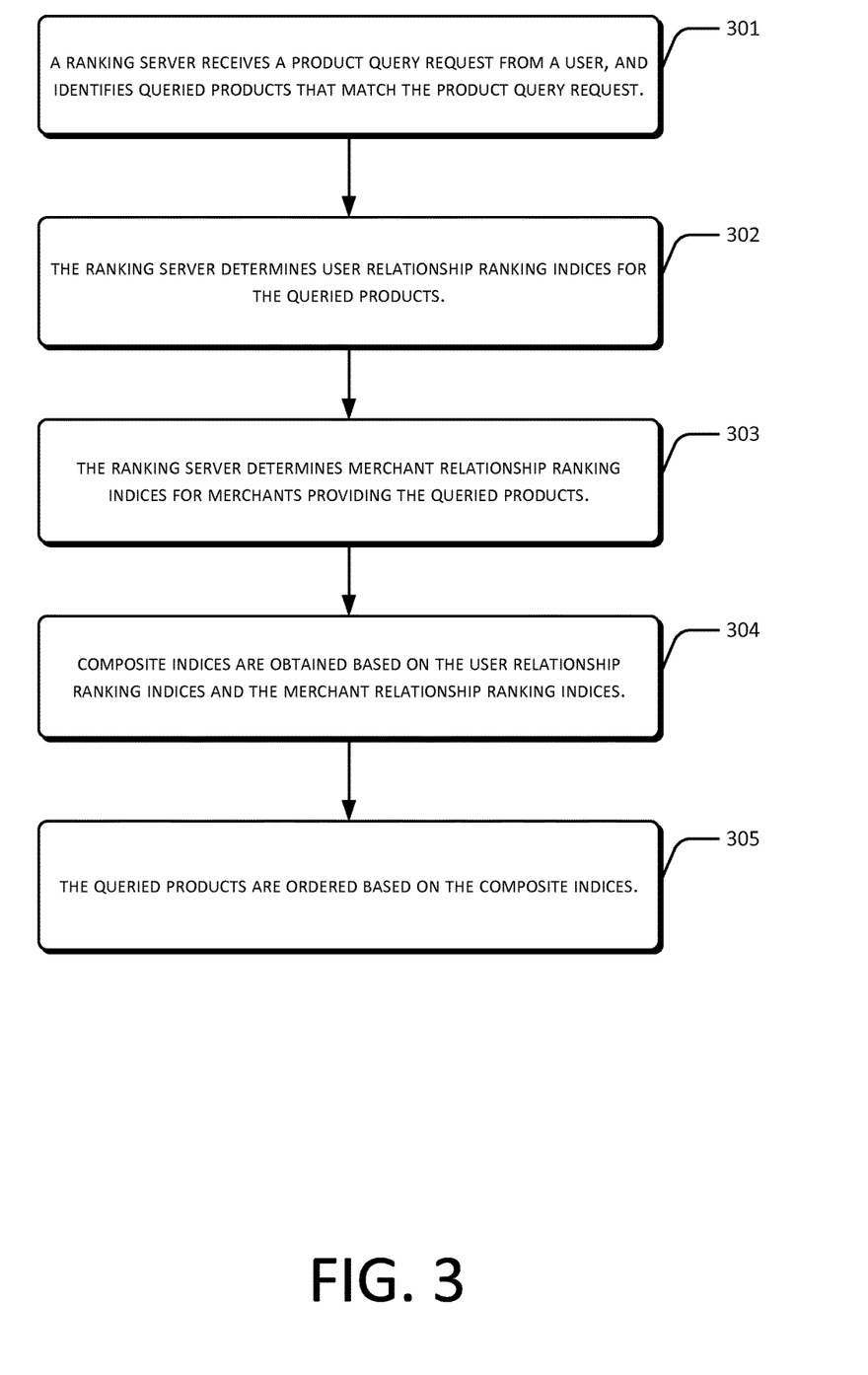
FIG. 3 is a flowchart of a ranking method based on interpersonal distances in accordance with the embodiments of the present disclosure.

As shown in FIG. 3, the present embodiment provides a flowchart of an interpersonal distance based ranking method based on technical concepts similar to the above example methods. As shown in the figure, the method may include:

At block 301, a ranking server receives a product query request from a user, and identifies queried products that match the product query request.

At block 302, the ranking server determines user relationship ranking indices for the queried products.

A process of determining the user relationship ranking indices of the queried products is the same as is the process described at block 102 to block 105.

At block 303, the ranking server determines merchant relationship ranking indices for merchants providing the queried products.

A process of determining the merchant relationship ranking indices of the merchants is the same as is the process described at block 202 to block 204.

At block 304, composite indices are obtained based on the user relationship ranking indices and the merchant relationship ranking indices.

Specifically, when a user relationship ranking index of the user is A, and a merchant relationship ranking index for the merchant is B, a composite index may be calculated using an equation as follow: $C=k_1*A+k_2*B$, wherein C is the composite index, $k_1$ and $k_2$ are weight systems, which may be determined based on empirical values.

At block 305, the queried products are ordered based on the composite indices.

Specifically, the queried products may be ordered in a descending order of the composite indices. For two products having the same average rating value and merchants which provide these two products have the same rating value, if one product has a higher composite index (which indicates that this product receives better comments from friends of the user or a social circle in which the user is involved), this product is more likely to be a search result that is desired by the user who submits the query.

Furthermore, the ranking methods provided in the embodiments of the present disclosure may also be combined with existing ranking method(s) to perform ranking. Weights associated with each ranking method in a final ranking result may be determined based on weight factors.

For example, the ranking server determines user relationship ranking indices for objects requested to be queried by a user, obtains an online shopping platform index given by an existing ranking method, determines composite indices based on the user relationship ranking indices and the online shopping platform index, and orders the objects based on the composite indices of the objects.

In the example methods of the present disclosure, upon ordering the objects based on the user relationship ranking indices, the merchant relationship ranking indices or the composite indices of the objects, the ranking server may return a query result to the client from which the user initiates the query.

Based on the same technical concepts of the above example methods, the embodiments of the present disclosure provide a ranking server.

Figure 4:
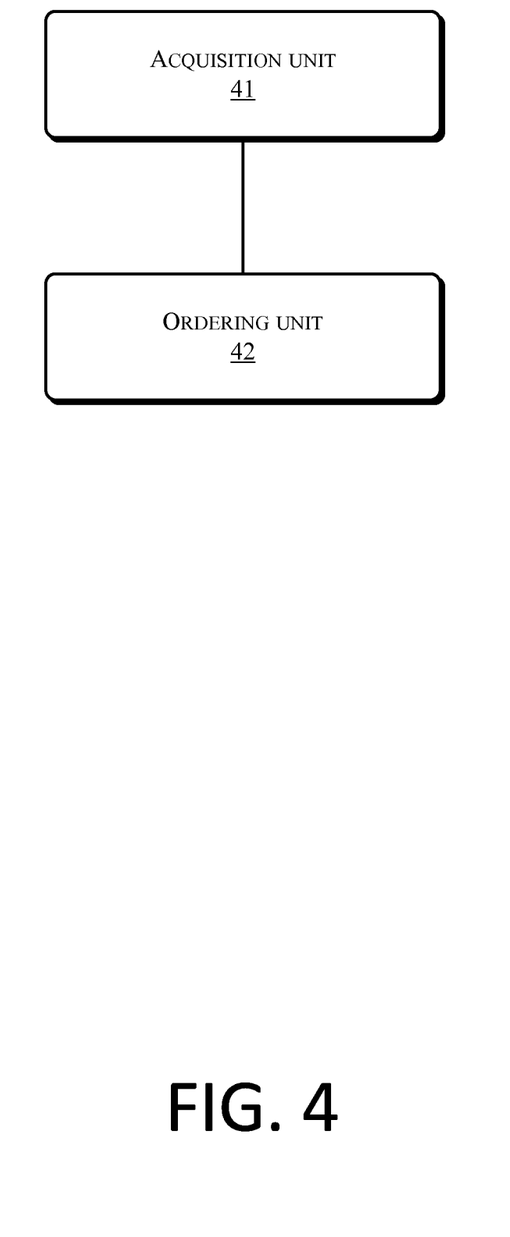
FIG. 4 is a schematic structural diagram of a ranking server in accordance with the embodiments of the present disclosure.

FIG. 4 is a schematic structural diagram of a ranking server in accordance with the embodiments of the present disclosure. The ranking server may include:

an acquisition unit 41, configured to obtain objects queried by a query request based on the request initiated from a user client and obtain reference user groups corresponding to the queried object;

the acquisition unit 41 further configured to obtain an interpersonal distance between each user of the reference user groups and a user who initiates the query request, and obtain rating scores of the objects queried by the request that are given by each user in respective reference user groups;

an ordering 42 unit, configured to determine user relationship ranking indices of the queried objects based on the interpersonal distances and the rating scores, and order the objects based on the user relationship ranking indices of the objects.

In the above server, the acquisition unit 41 selects the reference user groups for the objects, which include:

based on a sample size predetermined for the group of reference users, selecting a corresponding number of users who have recently purchased the object to form the group of reference users; or based on the sample size predetermined for the group of reference users, selecting a corresponding number of users who have recently expressed purchase intentions for the object to form the group of reference users; or based on the sample size predetermined for the group of reference users, selecting users who have recently purchased the object and users who have recently expressed purchase intentions for the object according to a given ratio to form the group of reference users.

In the above server, the acquisition unit 41 obtains the interpersonal distance between each user of the reference user group and the user who initiates the query request, including:

the acquisition unit 41 obtaining friendship relation information of the user from a social networking server, and determining the interpersonal distance between each user of the reference user group and the user who initiates the query request based on the received friendship relation information; or the acquisition unit 41 determining whether two users have common user properties based on user properties recorded in the social networking server, and determining an interpersonal distance based on the common user properties, wherein the more common properties the two users have, the shorter the interpersonal distance is.

In the above server, the acquisition unit 41 sets up weight factors for the interpersonal distances, the weight factors decreasing as the interpersonal distances increase.

The ordering 42 unit calculates the user relationship ranking indices based on the interpersonal distances between each user of respective reference user groups and the user who initiates the query request and the rating scores of the objects given by each user in respective reference user groups, including:

calculating average values of weighted rating scores based on the interpersonal distance associated with each user of respective reference user groups to obtain the user relationship ranking indices.

In the above server, the ordering unit 42 calculates the user relationship ranking indices using the following equation:

$$\text{User relationship Ranking index} = \text{SUM (rating score/interpersonal distance)/sample size.}$$

In the present embodiment, the ranking server selects reference user groups of objects requested to be queried based on a query request initiated by a user, obtains an interpersonal distance between each user of the reference user groups and the user who initiates the query request, obtains rating scores of the objects queried by the request that are given by each user in respective reference user groups, determines user relationship ranking indices of the queried objects based on the interpersonal distances and the rating scores, and orders the objects based on the user relationship ranking indices of the objects. Compared with the existing technologies, the example ranking server performs ranking based on interpersonal distances between a user and reference users and further on rating scores associated with the reference users, quantifies reference value of choices associated with a social network of the user with respect to the user's shopping choice, and provides a ranking method that is based on characteristics of the user.

Based on the same technical concepts of the above example methods, the embodiments of the present disclosure provide a ranking server.

Figure 5:
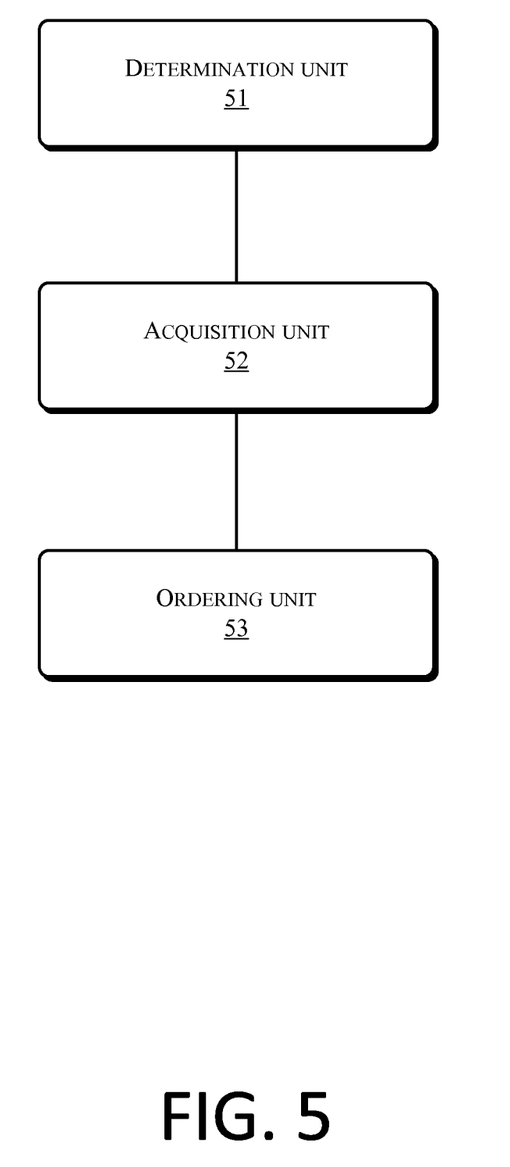
FIG. 5 is a schematic structural diagram of a ranking server in accordance with the embodiments of the present disclosure.

FIG. 5 is a schematic structural diagram of a ranking server in accordance with the embodiments of the present disclosure. The ranking server may include:

a determination unit 51, configured to determine reference merchants in which objects queried by a request are located based on the query request submitted from a user client;

an acquisition unit 52, configured to obtain interpersonal distances between a user who submits the query request and the reference merchants, and obtain rating scores of the reference merchants;

an ordering unit 53, configured to determine merchant relationship ranking indices for the reference merchants based on the interpersonal distances and the rating scores, and order the objects based on the merchant relationship ranking indices.

In the above server, the acquisition unit 52 obtains the interpersonal distances between the user who submits the query request and the reference merchants, including:

the acquisition unit 52 obtaining friendship relation information of the user from a social networking server, and determining the interpersonal distances between the user who initiates the query request and the reference merchants based on the received friendship relation information; or the acquisition unit 52 obtaining respective numbers of transaction and successful transaction rates between the user and the reference merchants from a transaction database, and determining the interpersonal distances between the user and the reference merchants based on respective numbers of transaction and successful transaction rates.

In the above server, the ordering unit 53 calculates the merchant relationship ranking indices of the reference merchants using the following equation:

$$\text{Merchant relationship ranking index} = \text{rating score/interpersonal distance.}$$

Based on the same technical concepts of the above example methods, the embodiments of the present disclosure provide a ranking server.

Figure 6:
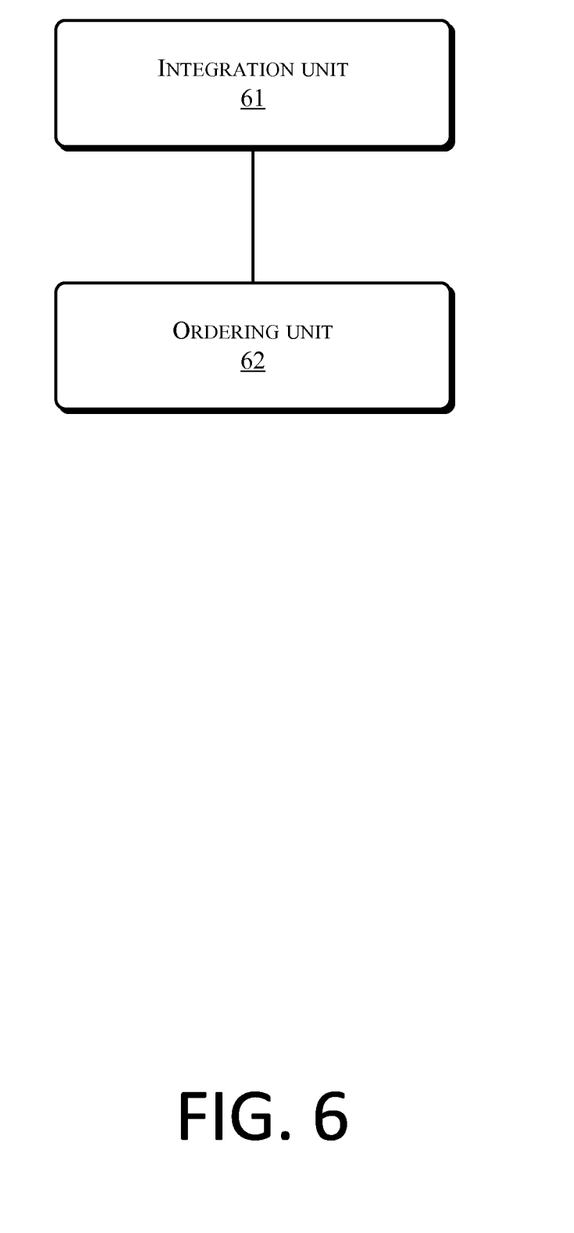
FIG. 6 is a schematic structural diagram of a ranking server in accordance with the embodiments of the present disclosure.

FIG. 6 is a schematic structural diagram of a ranking server in accordance with the embodiments of the present disclosure. The ranking server may include:

an integration unit 61, configured to receive a query request from a user client, obtain objects requested to be queried and determine composite indices of the objects;

an ordering unit 62, configured to order the objects based on the composite indices of the object;

wherein the integration unit 61 determines the composite indices based on one of the following strategies:

a first strategy: determining, by the ranking server, user relationship ranking indices of the objects requested to be queried by a user according to the above interpersonal distance based ranking method, and determining the composite indices of the objects based on the user relationship ranking indices and an online shopping platform index;

a second strategy: determining, by the ranking server, merchant relationship ranking indices of merchants in which the objects are located according to the above interpersonal distance based ranking method, and determining the composite indices of the objects based on the merchant relationship ranking indices and the online shopping platform index; or a third strategy: determining, by the ranking server, the user relationship ranking indices of the objects requested to be queried by the user according to the above interpersonal distance based ranking method, and determining the merchant relationship ranking indices for the merchants in which the objects are located according to the above interpersonal distance based ranking method; determining, by the ranking server, the composite indices of the objects based on the user relationship ranking indices and the merchant relationship ranking indices; or, determining, by the ranking server, the composite indices of the objects based on the user relationship ranking indices, the merchant relationship ranking indices and the online shopping platform index.

In the above server, the integrating unit 61 determines a composite index of an object, including: adding weights to the user relationship ranking indices, the merchant relationship ranking indices and the online shopping platform index of the object, and performing a summation thereof to obtain the composite index of the object.

The example ranking servers may further include: a feedback unit, configured to return a query result to the user who initiates the query based on an ordering result obtained by the ordering unit.

One skilled in the art can understand that modules of apparatuses in the embodiments may be located in the apparatuses according to the description of the embodiments, or may be changed accordingly and located in one or more apparatuses different from what is described in the respective embodiments. The modules in the embodiments may be combined as a single module, or may be further divided into a plurality of sub-modules.

From the exemplary embodiments described above, one skilled in the art can clearly understand that the disclosed method and system may be implemented using software with essential universal hardware platform, or using hardware, with the former being a better way of implementation under many situations. Based on this understanding, the technical scheme of the present disclosure or contributions to the existing technologies may be implemented in the form of software products which are stored in a storage media, including instructions for a computing device (e.g., a mobile phone, a personal computer, a server or a networked device, etc.) to execute the methods described in the exemplary embodiments of the present disclosure.

Figure 7:
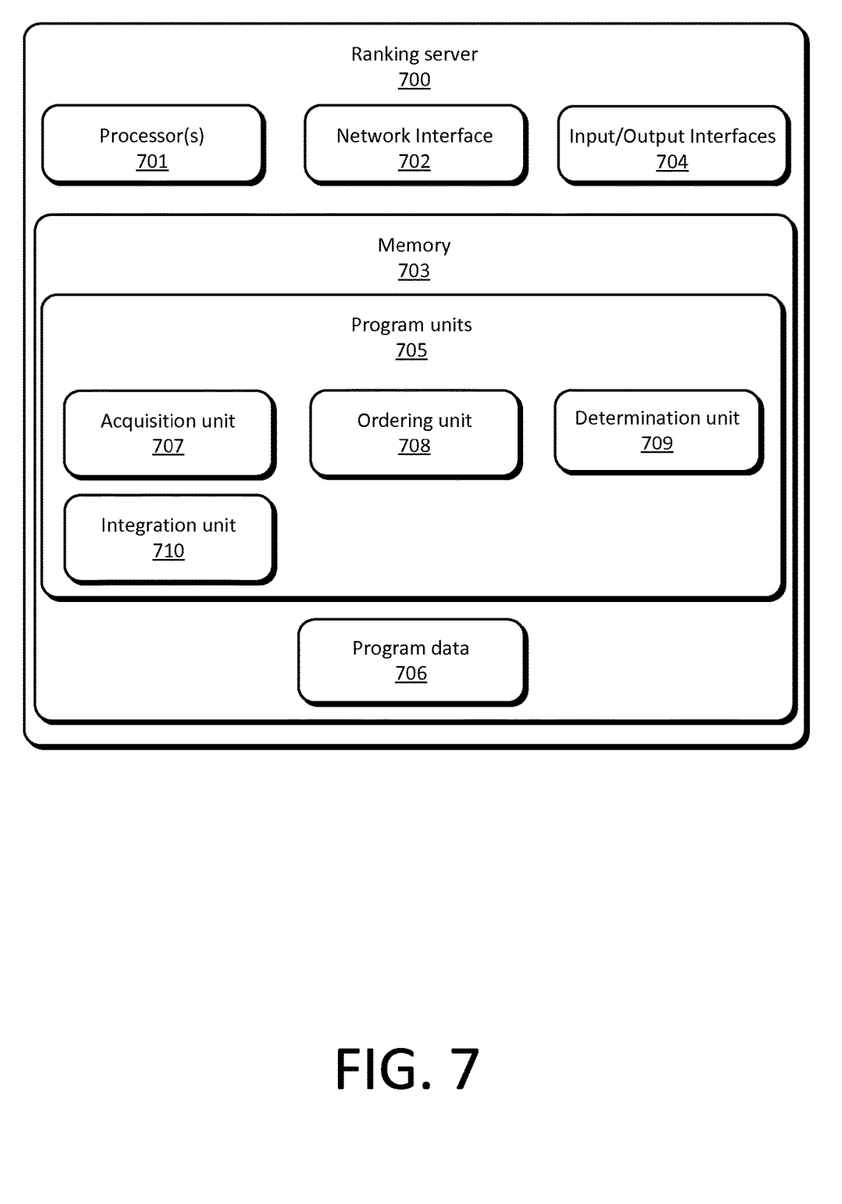
FIG. 7 is a schematic structural diagram of the example ranking server as described in FIG. 4-FIG. 6 in more detail.

For example, FIG. 7 illustrates an exemplary server 700, such as the server as described above, in more detail. In one embodiment, the server 700 can include, but is not limited to, one or more processors 701, a network interface 702, memory 703, and an input/output interface 704.

The memory 703 may include computer-readable media in the form of volatile memory, such as random-access memory (RAM) and/or non-volatile memory, such as read only memory (ROM) or flash RAM. The memory 703 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

The memory 703 may include program units 705 and program data 706. In one embodiment, the program units 705 may include an acquisition unit 707, an ordering unit 708, a determination unit 709 and an integration unit 710. Details about these program units and any sub-units and/or modules thereof may be found in the foregoing embodiments described above.

The above descriptions merely are preferred embodiments of the present disclosure. It should be noted that an ordinary person in the art may perform modifications and improvements in many different ways without departing from the spirit and the scope of this disclosure. Accordingly, it is intended that the present disclosure covers all modifications and improvements which fall within the scope of the claims of the present disclosure and their equivalents.

What is claimed is:

1. A method for ranking based on interpersonal distances, comprising:
    obtaining, by a ranking server, objects queried by a query request initiated by a user from a user client and obtaining a reference user group corresponding to each queried object;
    obtaining, by the ranking server, interpersonal distances between users in the reference user group and the user who initiates the query request, and obtaining rating scores of each of the objects queried by the query request that are given by the users in the reference user group; and
    determining, by the ranking server, a user relationship ranking index of each of the objects queried based on the interpersonal distances and the rating scores, and ordering the objects based on respective user relationship ranking indices of the objects.

2. The method of claim 1, wherein obtaining the reference user group corresponding to each queried object comprises:
    based on a sample size predetermined for the reference user group, selecting a corresponding number of users who have recently purchased a certain object of the objects queried used to form the reference user group; or
    based on the sample size predetermined for the reference user group, selecting a corresponding number of users who have recently expressed purchase intentions for the certain object; or
    based on the sample size predetermined for the reference user group, selecting users who have recently purchased the certain object and users who have recently expressed purchase intentions for the certain object according to a given ratio to form the reference user group.

3. The method of claim 1, wherein obtaining, by the ranking server, the interpersonal distances between the users in the reference user group and the user who initiates the query request comprises:
    obtaining, by the ranking server, friendship relation information of the user from a social networking server, and determining the interpersonal distances between the users of the reference user group and the user who initiates the query request based on the obtained friendship relation information; or
    determining, by the ranking server, whether two users have common user properties based on user properties recorded in the social networking server, and determining an interpersonal distance between the two users based on the common user properties,
    wherein the interpersonal distance between the two users decreases as a quantity of common properties of the two users increases.

4. The method of claim 3, wherein the social networking server stores one or more of the following:
    relationships between users and respective friends in a mailbox service system; relationships between users and respective friends in a social networking website; relationships between users and respective friends in an instant messaging system; relationships between users and respective friends in an online game platform; relationships between users and respective friends in a platform for sharing, disseminating and obtaining information based on user relationship; or relationships between users and respective friends in an electronic commerce website.

5. The method of claim 1, further comprising:
    determining weight factors based on the interpersonal distances, the weight factors decreasing as the interpersonal distances increase; and
    determining the user relationship ranking index of each queried object based on the interpersonal distances between the users in the reference user group and the user who initiates the query request and the rating scores of each object queried by the request that are given by the users in the reference user group, including calculating an average value of weighted rating scores based on the interpersonal distances associated with the users of the reference user group to obtain the user relationship ranking index.

6. The method of claim 1, wherein an equation of calculating the user relationship ranking index comprises:
the user relationship ranking index=SUM (a rating score/ an interpersonal distance)/a sample size.

7. The method of claim 1, further comprising:
determining reference merchants in which the objects queried are located; and
obtaining interpersonal distances between the user who initiates the query request and the reference merchants, and obtaining rating scores of the reference merchants.

8. The method of claim 7, further comprising determining merchant relationship ranking indices of the reference merchants based on the interpersonal distances and the rating scores of the reference merchants.

9. The method of claim 8, wherein ordering the objects is further based on the merchant relationship ranking indices of the reference merchants.

10. A ranking server comprising:
an acquisition unit configured to:
obtain objects queried by a query request and obtain reference user groups corresponding to the queried objects based on the query request initiated by a user from a user client, and
obtain an interpersonal distance between each user of the reference user groups and the user who initiates the query request, and obtain rating scores of the objects queried by the query request that are given by each user in respective reference user groups; and
an ordering unit configured to:
determine user relationship ranking indices of the queried objects based on the interpersonal distances and the rating scores, and
order the objects based on the user relationship ranking indices of the objects.

11. The server of claim 10, wherein:
the acquisition unit sets up weight factors for the interpersonal distances, the weight factors decreasing as the interpersonal distances increase,
the ordering unit calculates the user relationship ranking indices based on the interpersonal distances between each user of respective reference user groups and the user who initiates the query request and the rating scores of the objects queried given by each user in respective reference user groups, and
the ordering unit calculates average values of weighted rating scores based on the interpersonal distance associated with each user of respective reference user groups to obtain the user relationship ranking indices.

12. The server of claim 10, further comprising a feedback unit configured to return the query result to the user client which initiates the query based on an ordering result obtained by the ordering unit.

13. The server of claim 10, further comprising a determination unit configured to determine reference merchants in which the objects queried are located based on the query request submitted from the user client, wherein:
the acquisition unit is further configured to obtain interpersonal distances between the user who initiates the query request and the reference merchants, and obtain rating scores of the reference merchants, and
the ordering unit is further configured to determine merchant relationship ranking indices for the reference merchants based on the interpersonal distances between the user who initiates the query request and the reference merchants and the rating scores of the reference merchants, and order the objects based further on the merchant relationship ranking indices.

\* \* \* \* \*